C. Schifferly.
Churn.

Nº 73125.  Patented Jan. 7, 1868.

Witnesses
C. F. Brown
R. S. Turner.

Inventor
C. Schifferly by
Geo. E. Brown
Attorney

United States Patent Office.

CONRAD SCHIFFERLY, OF BOURBON, INDIANA.

Letters Patent No. 73,125, dated January 7, 1868.

IMPROVEMENT IN CHURNS.

The Schedule referred to in these Letters Patent and making part of the same.

TO ALL WHOM IT MAY CONCERN:

Be it known that I, CONRAD SCHIFFERLY, of Bourbon, in the county of Marshall, and State of Indiana, have invented a new and useful Improvement in Churns; and I do hereby declare the following to be a full, clear, and exact description of the construction and operation of the same, reference being had to the annexed drawings.

Figure 1:
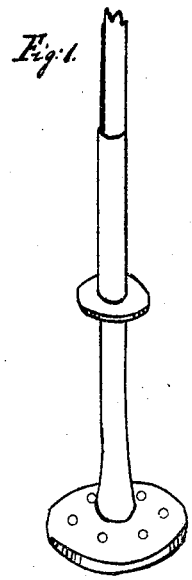
Figure 1 represents a perspective view of the dasher.
Figure 2:
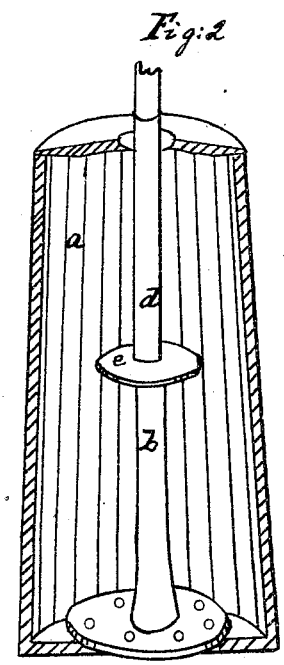
Figure 2 is a longitudinal vertical central section of a churn, with the dasher.

This invention consists of a saucer-shaped disk, rigidly attached to the dasher of an up-and-down churn, in such manner as to prevent the escape of cream through the orifice in the cover, as will hereinafter be more fully described.

To enable others skilled in the arts to make and use my invention, I will proceed to describe its construction and operation.

$a$ represents an ordinary churn, of which $b$ is the dasher. That part of the dasher which comes in contact with the cover $c$ during its up-and-down motion, is sheathed with sheet metal, $d$. To the lower part of said sheathing, and within the churn, is attached the saucer-shaped disk $e$, with its concavity downward. The lower side of the cover $c$ is hollowed out to such an extent that the saucer-shaped disk, when brought in contact therewith, fits accurately, and thus prevents the escape through the cover of any cream that may be thrown up by the dasher during the process of churning. The disk also produces the same effect when not in contact with the cover, as during its descent with the cover it catches any small masses of cream that may be flying upward from the central part of the churn.

Those familiar with the operation of churning, know how considerable is the quantity of cream that ordinarily escapes from an upright churn of the kind herein referred to, and how great is the nuisance resulting therefrom. This waste and annoyance are prevented by the use of this simple invention.

Having thus described my invention, what I claim as new, and desire to secure by Letters Patent, is—

In combination with the dasher $b$, the saucer-shaped disk $e$, as and for the purpose described.

CONRAD SCHIFFERLY.

Witnesses:
T. J. DEMOSS,
LORENZO D. HESS.